United States Patent
Kao

(10) Patent No.: US 6,727,893 B2
(45) Date of Patent: Apr. 27, 2004

(54) CONVERTER CAPABLE OF MAKING A FIVE-WIRE OR SIX-WIRE RESISTIVE TOUCH SCREEN COMPATIBLE WITH A FOUR-WIRE CONTROLLER

(75) Inventor: George Kao, Taipei (TW)

(73) Assignee: Eturbotouch Technology Inc., Chung-Li (TW)

( * ) Notice: Subject to any disclaimer, the term of this patent is extended or adjusted under 35 U.S.C. 154(b) by 0 days.

(21) Appl. No.: 10/273,175

(22) Filed: Oct. 18, 2002

(65) Prior Publication Data

US 2003/0080716 A1 May 1, 2003

(30) Foreign Application Priority Data

Oct. 26, 2001 (TW) ..................... 90218369 U

(51) Int. Cl.$^7$ ................................. G09G 5/00
(52) U.S. Cl. ..................................... 345/173
(58) Field of Search ............... 345/156, 173, 345/174, 175, 178; 323/265, 266, 268

(56) References Cited

U.S. PATENT DOCUMENTS 4,386,232 A * 5/1983 Slater ......................... 345/173
5,917,477 A * 6/1999 Lee ............................. 345/173
6,456,952 B1 * 9/2002 Nathan ......................... 702/94

* cited by examiner

Primary Examiner—Matthew V. Nguyen
(74) Attorney, Agent, or Firm—Dennison, Schultz, Dougherty & MacDonald

(57) ABSTRACT

A converter capable of making a five-wire or six-wire resistive touch screen compatible with a four-wire controller comprises an encode-decode circuit composed by at least two multiplexers and a signal amplification analog circuit; wherein the signal amplification analog circuit receives, analogizes and amplifies and inputs the signals transmitted by the four-wire controller to the encode-decode circuit thereby controlling the multiplexers whether to receive or process a non-encoded voltage signal and to output the voltage signal re-encoded by the multiplexers. Therefore, it recomposes, re-encodes and re-decodes the voltage signals (I/O signals) output or input by a five-wire or a six-wire touch screen so as to make the processed voltage signals compatible with the four-wire controller for processing.

4 Claims, 7 Drawing Sheets

| Logic circuits of multiplexers | Low levels of voltage signals processed | High levels of voltage signals processed | Processed signal positions of 5 wire / 6 wire touch panel |
|---|---|---|---|
| IC1 | X+ | Y+ | Wiper |
| IC2 | Y− | X+ | Upper right corner(UR) |
| IC3 | Y+ | X− | Lower left corner(LL) |
| IC4 | Y− | X− | Lower right corner(LR) |
| IC5 | Y+ | X+ | Upper left corner(UL) |

FIG.3

CONVERTER CAPABLE OF MAKING A FIVE-WIRE OR SIX-WIRE RESISTIVE TOUCH SCREEN COMPATIBLE WITH A FOUR-WIRE CONTROLLER

BACKGROUND OF THE INVENTION

1) Field of the Invention

The present invention relates to a converter capable of making a five-wire or six-wire resistive touch screen compatible with a four-wire controller, more particularly, to a five-wire or six-wire touch screen connected with a converting circuit to be compatible with a four-wire controller.

2) Description of the Prior Art

Accordingly, regular touch screens available on the market are divided into a four-wire resistive touch screen and a five-wire or six-wire resistive touch screen. A typical structure of a four-wire resistive touch screen, as indicated in FIGS. 4 and 5, comprises a parallel-serial resistor loop formed by two electrode wires on two different planes of an upper sheet electrode plate and a lower sheet electrode plate. The main structure thereof has a lower base plate made of glass (A) printed with a lower conductive film (A1) or ITO sheet, a set of isolating point sheet (G), an isolating sheet (B), a silver conductive sheet (D, D2), a linear sheet (C), another isolating sheet (F), an upper conductive film (E1) or ITO sheet and a plastic film (E); wherein one connecting end of a bus line (T) connects with a connecting end (D1) of the silver conductive sheet (D). Another connecting end of the bus line (T) connects with a four-wire controller (not shown). According to the working principle, the four-wire controller conducts the silver conductive sheets (D, D2) to form a parallel-serial resistor loop inbetween; wherein the lower conductive film (A1) forms an evenness filed in an X-axis direction. When the plastic film (E) is touched, the upper conductive sheet (E1) contacts the lower conductive film (A1) via the isolating point (G) thereby detecting the reference voltage of the contact point. The voltage level ratio stands for the ratio of the directional position (or X-axis direction) on the touch screen. After detecting the direction, the four-wire controller converts the upper conductive film (E1) to an evenness field in a Y-axis direction. The lower conductive film (A1) detects the voltage level of the upper touch point for further detecting the position of another Y-axis direction. For detail working principle, please refer to U.S. Pat. No. 3,622,105.

Referring to FIG. 5, the upper silver sheet (D2) and the lower silver sheet (D) are not on the same plane; they are connected by a silver glue point (D4) to form a parallel-serial resistor loop; when the upper plastic film (E) is touched, the field between the upper and the lower silver sheets (D, D2) starts to change thereby generating voltage signals at four different coordinates for output.

The five-wire resistive touch screen has only one electropolar sheet on the same plane. As indicated in FIG. 6, a silver sheet (E) or the electropolar wire is printed on an isolating sheet (B) as a single electropolar sheet. As indicated in FIG. 7, the difference between the six-wire and a five-wire touch screens is that the bottom of glass (A) is printed with a sheet of conductor wire (B) with a ground connecting end (B1) for eliminating the noise. The six-wire touch screen also has only one electropolar sheet or silver sheet (E). However, the main difference between the four-wire resistive touch screen and the five-wire or six-wire touch screen is that, when being touched, the four-wire resistive touch screen generates four voltage signals X+, Y+, Y−, X−, but the five-wire or six-wire touch screen generates five voltage signals (X+, Y+), (X+, Y−), (X−, Y+), (X−, Y−) and (Y+, X+). The four-wire controller processes the four voltage signals generated by the four-wire touch screen. The five-wire controller processes the five voltage signals generated by the five-wire or six-wire touch screen. Obviously, the advanced five-wire or six-wire touch screen is not compatible with the traditional four-wire controller available in many computer systems. For using the five-wire controller for the advanced five-wire or six-wire touch screen, the old four-wire controller (including the entire computer system) has to be replaced and that is considered a waste in terms of cost.

Therefore, how to utilize a converter device or circuit to connect with the traditional four-wire controller to make it compatible with the five-wire or six-wire resistive touch screen is the research issue of the present invention.

SUMMARY OF THE INVENTION

Therefore, the primary objective of the present invention is to provide a converter capable of making a resistive (voltage type) five-wire or six-wire touch screen to be compatible with a four-wire controller; a connecting end of the four-wire controller in a computer system connects with a converter or circuit to connect with a connecting end of a five-wire or six-wire touch screen to recompose, encode and decode the voltage signals (I/O signals) output or input by the five-wire or six-wire touch screen so as to make the processed voltage signals compatible with the four-wire controller for processing.

To enable a further understanding of the structural features and the technical contents of the present invention, the brief description of the drawings below is followed by the detailed description of the preferred embodiment.

BRIEF DESCRIPTION OF THE DRAWINGS

FIG. 3 is a table of high and low levels of voltage signals processed by a multiplexer of the present invention.

DETAILED DESCRIPTION OF THE PREFERRED EMBODIMENTS

Figure 1:
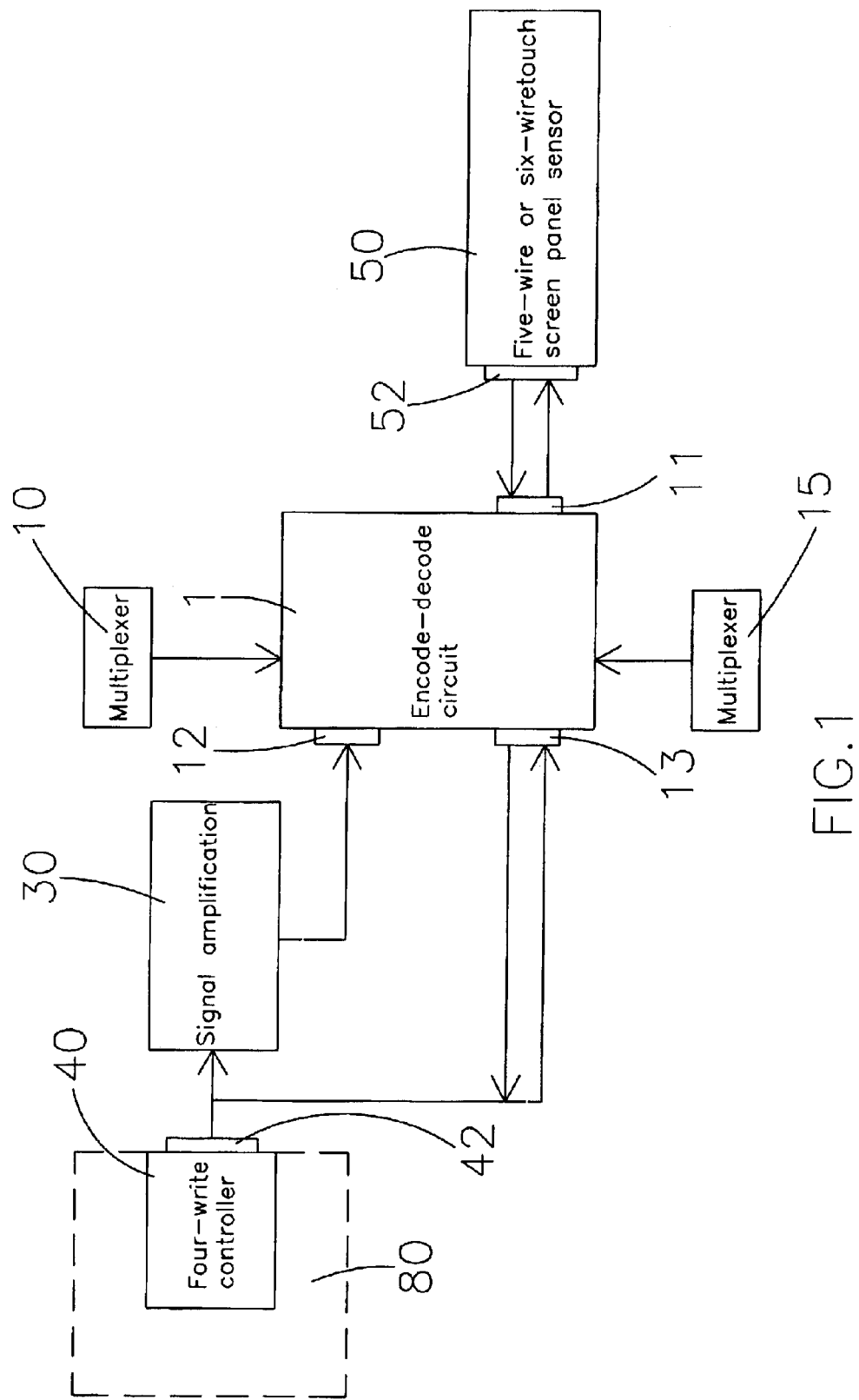
FIG. 1 is a block diagram of the float chart of the present invention.
Figure 2:
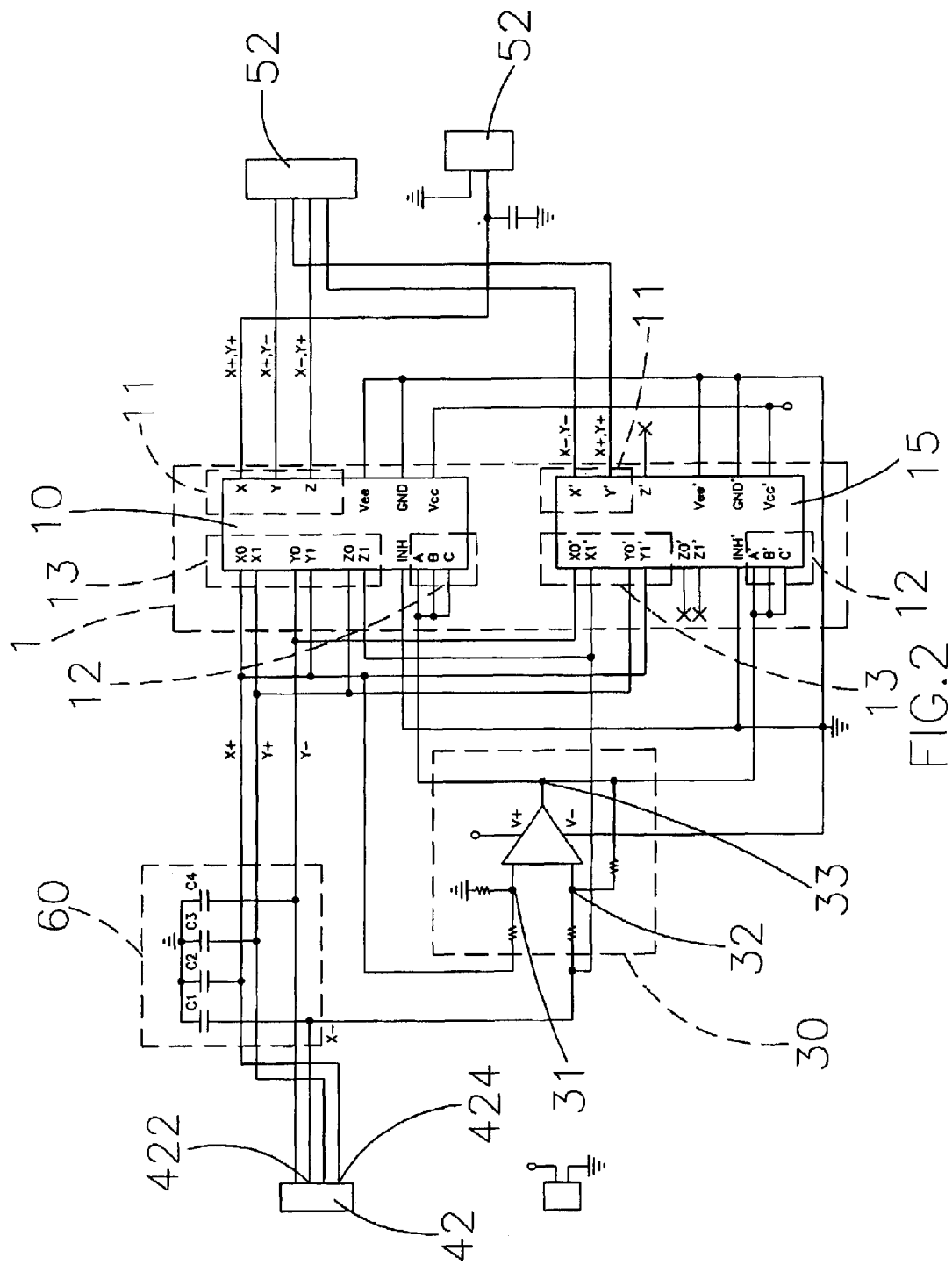
FIG. 2 is a circuit diagram of the present invention.
Figure 4:
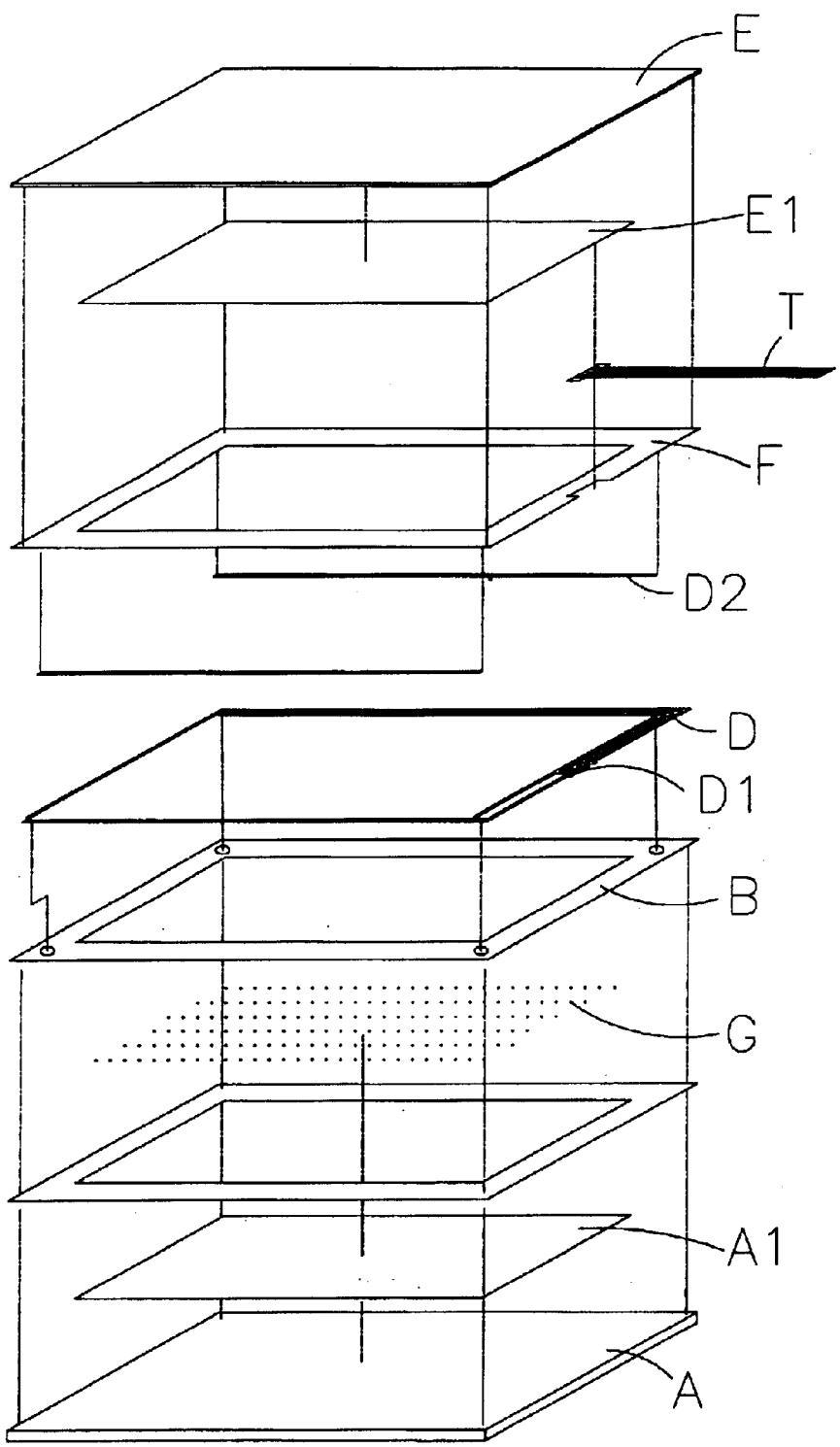
FIG. 4 is a pictorial and exploded drawing of the structure of a conventional four-wire resistive or voltage type touch screen.
Figure 5:
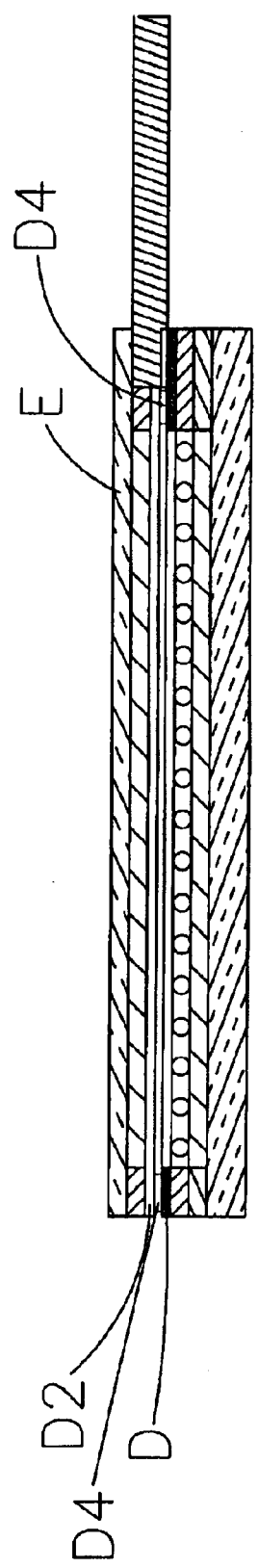
FIG. 5 is a cross-sectional drawing of the structure of a conventional four-wire resistive or voltage type touch screen.
Figure 6:
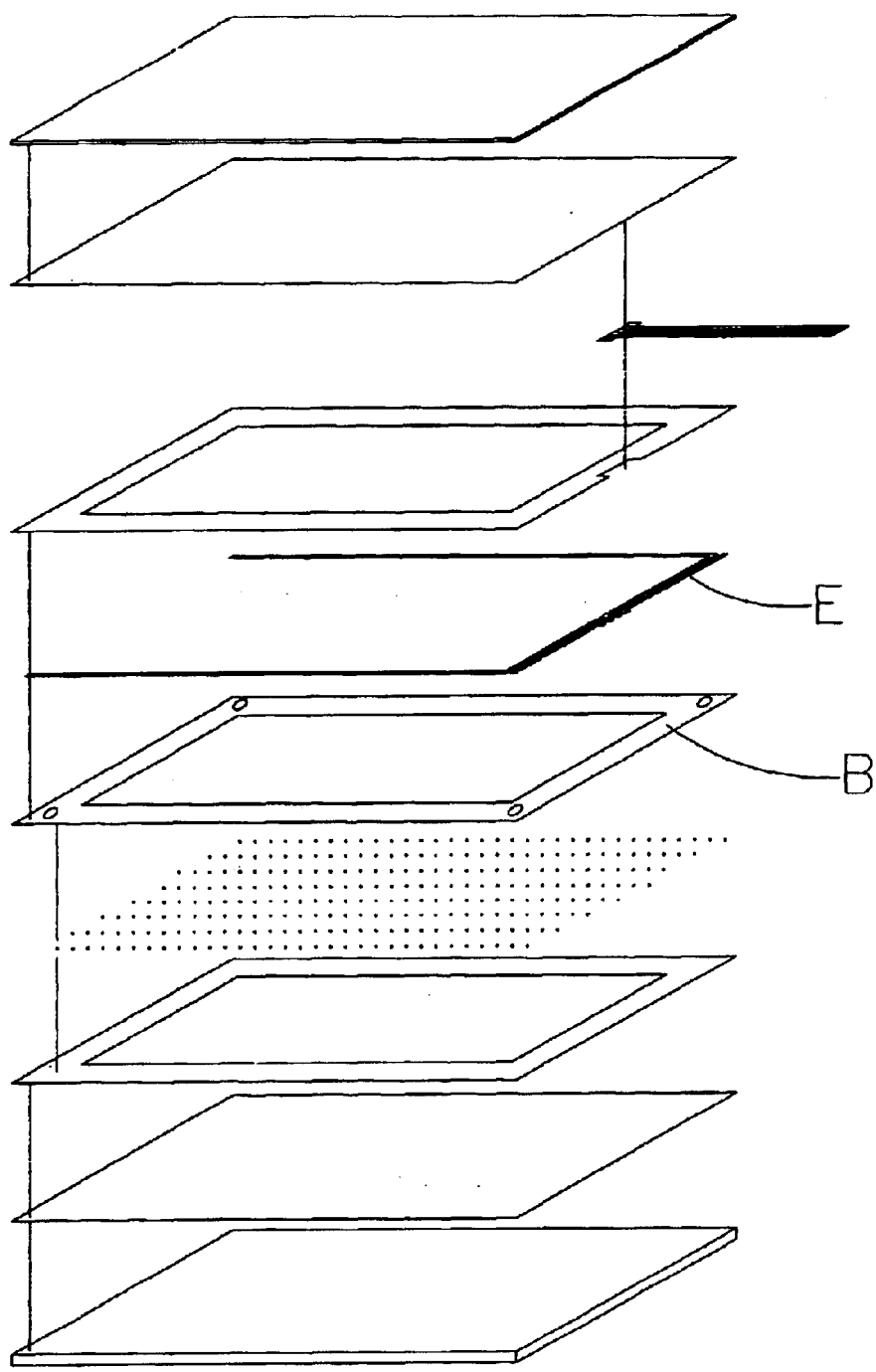
FIG. 6 is a pictorial and exploded drawing of the structure of a conventional five-wire resistive or voltage type touch screen.
Figure 7:
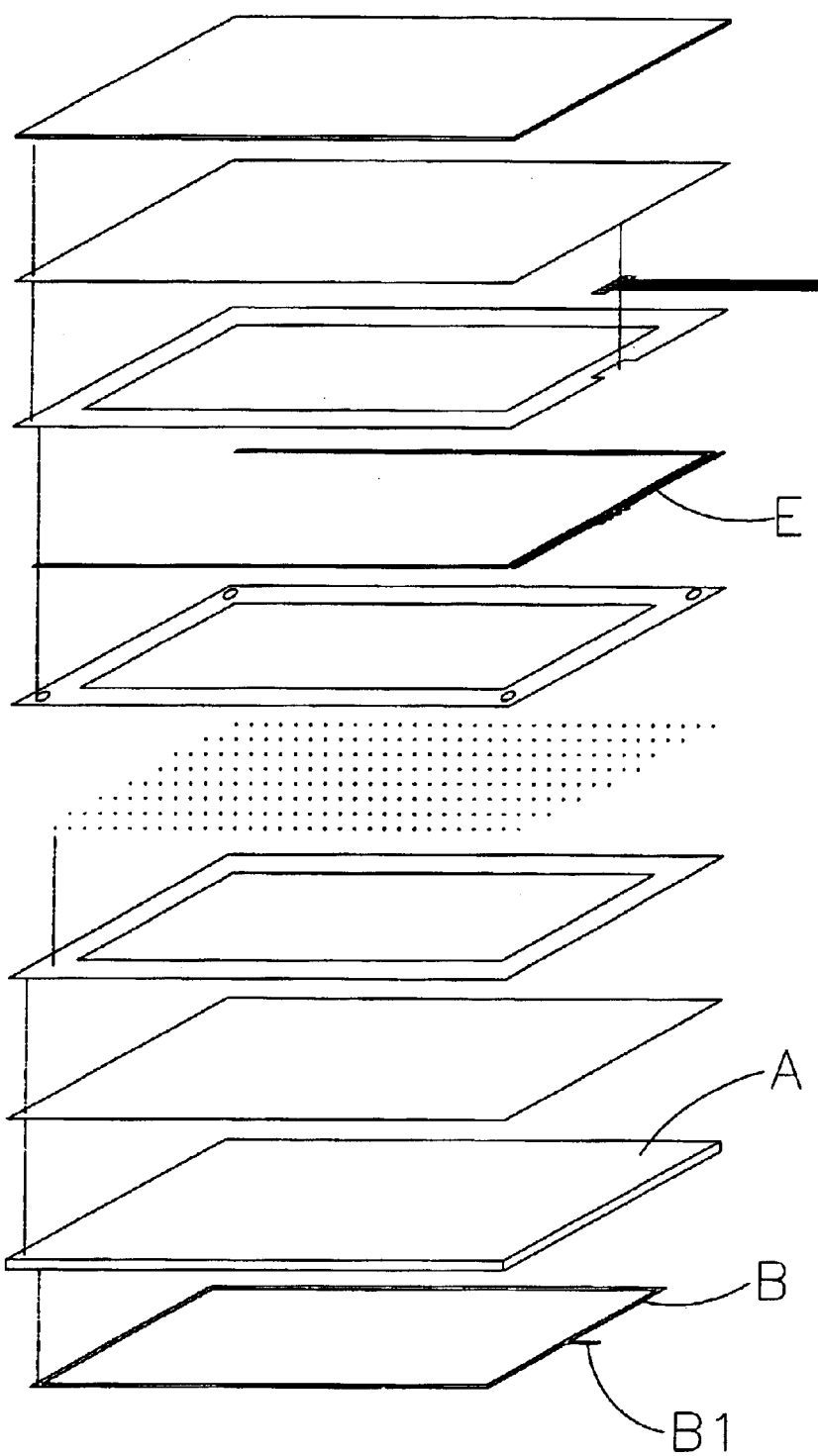
FIG. 7 is a pictorial and exploded drawing of the structure of a conventional six-wire resistive or voltage type touch screen.

Referring to FIGS. 1 and 2, the device and circuit of the present invention are characterized that an encode-decode circuit (1) comprises at least two multiplexers (10, 15) for outputting a recomposed and re-encoded voltage signal. One conduct port (11) at one end thereof connects with a conduct port (52) of a five-wire or six wire touch screen panel sensor (50); conduct ports (12, 13) at the other ends hereof respectively connect with a signal amplification analog circuit (30)

and a conduct port (42) of a four-wire controller (40); wherein the signal amplification analog circuit (30) receives, analogizes and amplifies the signal transmitted by the four-wire controller (40) and inputs the processed signals into the encode-decode circuit (1) thereby controlling the multiplexers (10, 15) whether to receive or process a non-encoded voltage signal and to output the voltage signals re-encoded by the multiplexers (10, 15).

According to the abovementioned main features, wherein the encode-decode circuit (1) is capable of processing or re-encoding four sets of voltage signals (X+, Y+, Y−, X−) transmitted by the four-wire controller (40) so as to output five sets of voltage signals (X+, Y+), (Y−, X+), (Y+, X−), (Y−, X−) and (Y+, X+) to the five-wire or six wire touch panel sensor (50). In addition, it decodes and filters five sets of voltage signals (X+, Y+), (Y−, X+), (Y+, X−), (Y−, X−) and (Y+, X+) output reversely thereto when the touch panel sensor (50) is touched; it also inputs reversely the processed four sets of voltage signals (X+, Y+, Y−, X−) to the four-wire controller (40) for further process.

According to the abovementioned main features, the signal conduct port (42) connects with the four-wire controller (40); the other conduct port (52) connects with the five-wire or six-wire touch panel sensor (50).

According to the abovementioned main features, wherein a filter circuit (60) comprises more than one condenser (C1, C2, C3, C4); a connecting end thereof connects with the conduct port (42) of the four-wire controller (40) for the filtering function of signal output at the four-wire controller (40) and signal input at the multiplexers (10, 15).

According to the abovementioned primary and secondary features, the present invention has the following advantages when in implementation:

1. Referring to FIGS. 1 and 2, the encode-decode circuit (1) comprises two multiplexers (10, 15) with IC code numbers of 4053. It recomposes the bilateral switching encode-decode of the voltage signal. The connecting ends (X, Y, Z, X', Y') of the multiplexers (10, 15) connect with the conduct port (52) of the five-wire or six-wire resistive touch panel sensor (50). An output end (33) of the signal amplification analog circuit (30) connects with connecting ends (A, B, C, A', B', C') of the conduct port (12) of the multiplexers (10, 15); an input end (31) connects with connecting ends ($X_0$, $Y_1$, $Y_1'$) and the fourth connecting end (424) of the conduct port (42); another input ends (32) connects with connecting ends ($X_1'$, $Z_1$) of the multiplexers (10, 15) and the second connecting end (422) of the conduct port (42). The signal amplification analog circuit (30) receives, analogizes and amplifies the signals transmitted from the four-wire controller (40); then it inputs the amplified signals to the connecting ends (A, B, C, A', B', C') of the multiplexers (10, 15) thereby controlling it whether to receive or process the non-decode voltage signals received at the conduct ports (12) on the two lateral sides of the multiplexers (10, 15); in addition, it controls whether to output the voltage signals re-encoded by the multiplexers (10, 15).

2. When the touch panel sensor (50) is not touched and is in a static status, the four-wire controller (40) outputs four voltage signals (X+, Y+, Y−, X−) of different coordinators to the multiplexers (10, 15) and the signal amplification analog circuit (30) via the conduct port (42). The signal amplification analog circuit (30) inputs the processed and amplified signals to the connecting ends (A, B, C, A', B', C') of the multiplexers (10, 15) for processing as well as orders the multiplexers (10, 15) to receive and process the voltage signals (X+, Y+, Y−, X−). That makes the connecting end (X) of the multiplexers (10, 15) output voltage signals (X+, Y+), the connecting end (Y) output voltage signals (Y−, X+), the connecting end (Z) output the voltage signals (Y+, X−), the connecting end (X') output the voltage signals (Y−, X−) and the connecting end (Y') output the voltage signals (Y+, X+). The five sets of voltage signals (X+, Y+), (Y−, X+), (Y+, X−), (Y−, X−) and (Y+, X+) processed and output by the multiplexers (10, 15) are input to the five-wire or six-wire touch panel sensor (50). Furthermore, the filter circuit (60) comprises more than one condenser (C1, C2, C3, C4) for filtering the output signals of the four-wire controller (40) and the input signals of the multiplexers (10, 15).

3. When the touch panel sensor (50) is touched, the voltage signals of different levels generated by touch points at coordinators of X or Y axes are output by the conduct port (52) of the touch panel sensor (50). The rearrangement of a resistor loop generated by touching outputs five sets of voltage signals (X+, Y+), (Y−, X+), (Y+, X−), (Y−, X−) and (Y+, X+) and they are input reversely to the multiplexers (10, 15) together via the conduct port (52) for processing. In addition, the four-wire controller (40) outputs a command to the signal amplification analog circuit (30) for processing. After that, the output end (33) outputs the signals to the connecting ends (A, B, C, A', B', C') of the multiplexers (10, 15) for decoding or filtering. Then the processed voltage signals (X+, Y+, X−, Y−) are respectively output to the four-wire controller (40) via the connecting ends ($X_0$, $X_1$, $Y_0$, $Y_1$, $Z_0$, $Z_1$, $X_0'$, $X_1'$, $Y_0'$, $Y_1'$) for detecting and reading. The processed voltage signals are input to a microcomputer (Central Process Unit, CPU) in a system (80). The alternated signals of the read and processed reference voltage are displayed on a monitor through a transparent film on the touch panel sensor (50). Therefore, a user directly writes, draws or points the various functions, such as switching the function windows, on the transparent film (not shown).

4. Referring to FIG. 3, the interiors of the multiplexers (10, 15) of the present invention comprise six logic circuits. The present invention only uses five logic circuits (IC1, IC2, IC3, IC4, IC5) thereof. The five sets logic circuits (IC1, IC2, IC3, IC4, IC5) sequentially process the voltage signals (X+, Y+, X−, Y−) input by the four-wire controller (40). The logic circuit (IC1) respectively outputs the processed voltage signals (X+, Y+) to a signal wiper on a touch board of the five-wire or six-wire touch panel sensor (50). The logic circuit (IC2) outputs the processed voltage signals (Y−, X+) to a leading end at an upper right corner (UR) of the five-wire or six-wire touch panel sensor (50). The logic circuit (IC3) outputs the voltage signals (Y+, X−) to a leading end at a lower left corner (LL) of the five-wire or six-wire touch panel sensor (50). The logic circuit (IC4) outputs the processed voltage signals (Y−, X−) to a leading end at a lower right corner (LR) of the parallel-serial resistor loop of the five-wire or six-wire touch panel sensor (50). The logic circuit (IC5) outputs the processed voltage signals (Y+, X+) to a leading end at an upper left corner (UL) of the parallel-serial resistor loop of the five-wire or six-wire touch panel sensor (50). Therefore, the five-wire or six-wire touch panel sensor (50) forms a parallel-serial resistor loop for detecting the voltage signals when the touch panel sensor (50) is touched. When it is not touched, the four-wire controller (40) does not receive or process the reverse signals processed by the encode-decode circuit (1).

5. The main design concept of the encode-decode circuit (1) composed by the two multiplexers (10, 15) is that during the voltage signal detection and measuring when the five-wire or six-wire touch panel sensor (50) is touched, the encode-decode circuit (1) re-encodes or filters the five sets of voltage signals (X+, Y+), (Y-, X+), (Y+, X-), (Y-, X-) and (Y+, X+) as four sets of voltage signals (X+, Y+, X-, Y-) to be compatible with and read by the four-wire controller (40). Furthermore, it makes the conventional four-wire controller (40) compatible with the five-wire or six-wire touch panel sensor (50).

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A converter capable of making a five-wire or six-wire resistive touch screen compatible with a four-wire controller is characterized that:

an encode-decode circuit composed by at least two multiplexers for outputting re-encoded voltage signals has a conduct port at one end connecting with a conduct port of a five-wire or six-wire touch screen; a conduct port at the other end respectively connects with a signal amplification analog circuit and a conduct port of a four-wire controller; wherein the amplification circuit receives, amplifies and inputs the signals transmitted by the four-wire controller to the encode-decode circuit thereby controlling the multiplexers whether to receive or process the non-encoded and non-decoded voltage signals; it also controls the input and output of the voltage signals re-encoded by the multiplexers thereby recomposing, re-encoding or re-decoding the voltage signals (I/O signals) output or input by the five-wire or six-wire touch screen so as to make the processed voltage signals compatible with the four-wire controller.

2. The converter capable of making a five-wire or six-wire resistive touch screen compatible with a four-wire controller according to claim 1, wherein the encode-decode circuit re-encodes four sets of voltage signals transmitted by the four-wire controller to output five sets of voltage signals to the five-wire or six-wire touch screen; it also reversely outputs the voltage signals to the five sets of voltage signals for decoding and filtering when the touch screen is touched; furthermore, it reversely inputs the processed four sets of voltage signals to the four-wire controller for processing.

3. The converter capable of making a five-wire or six-wire resistive touch screen compatible with a four-wire controller according to claim 1, wherein the signal conduct port connects with the four-wire controller; the other conduct port connects with the five-wire or six-wire touch screen.

4. The converter capable of making a five-wire or six-wire resistive touch screen compatible with a four-wire controller according to claim 1, wherein a connecting end of a filter circuit composed by more than one condenser connects with the conduct port of the four-wire controller for the function of filtering the signal output of the four-wire controller and signal input of the multiplexers.

* * * * *